United States Patent [19]

Glesmann

[11] Patent Number: 5,314,205
[45] Date of Patent: May 24, 1994

[54] SKELETAL CHASSIS FOR MOTOR-HOME ROADWAY VEHICLES

[76] Inventor: Herbert C. Glesmann, 6145 S. 102nd St., Omaha, Nebr. 68127

[21] Appl. No.: 914,476

[22] Filed: Jul. 15, 1992

Related U.S. Application Data

[63] Continuation-in-part of Ser. No. 529,490, May 29, 1990, abandoned.

[51] Int. Cl.$^5$ .................. B62D 21/04; B62D 21/18
[52] U.S. Cl. ..................... 280/783; 280/781; 280/782; 296/37.14
[58] Field of Search ............ 280/781, 782, 783, 798, 280/785, 711, 834, 755; 296/204, 37.14, 24.1, 164, 37.1; 180/68.4, 24.09, 24.11

[56] References Cited

U.S. PATENT DOCUMENTS

| | | | |
|---|---|---|---|
| 1,530,834 | 3/1925 | Kelly | 296/37.1 |
| 2,079,218 | 5/1937 | Ledwinka | 280/782 |
| 2,918,305 | 12/1959 | Faiver | 280/711 |
| 3,287,058 | 11/1966 | Wells | 296/37.14 |
| 3,366,411 | 1/1968 | Vittone | 280/781 |
| 3,517,572 | 6/1970 | Schmid | 180/24.11 |
| 3,586,363 | 6/1971 | Omlid | 280/834 |
| 3,693,742 | 9/1972 | Eiler et al. | 180/24.11 |
| 4,159,844 | 7/1979 | Weiner | 296/37.1 |
| 4,264,014 | 4/1981 | Hogg et al. | 280/755 |
| 4,287,961 | 9/1981 | Steiger | 180/68.4 |
| 4,418,853 | 12/1983 | Shaffer | 296/37.1 |
| 4,746,164 | 5/1988 | Crean | 296/37.14 |

FOREIGN PATENT DOCUMENTS 276201 7/1930 Italy ..................... 280/781

Primary Examiner—Karin L. Tyson
Attorney, Agent, or Firm—George R. Nimmer

[57] ABSTRACT

For the skeletal chassis of very-lengthily longitudinally extending motor-home roadway vehicles, the chassis' major and pre-eminent weight-bearing capability has traditionally been furnished by two or more lengthily longitudinally extending, parallel structural members. Departing from such prior art, the very-lengthily longitudinally extending skeletal chassis herein utilizes a single, longitudinally elongate central-axis tubular member as the major and pre-eminent weight-bearing structural member. Such reliance upon a single only central-axial structural member has numerous advantages for motor-home vehicles including, inter alia, providing a torsionally rigid underlying chassis therefor, capability for accommodating longitudinally consecutive and sidewardly-open storage compartments therealong, and for providing therealong a conduit for power and utility lines.

6 Claims, 2 Drawing Sheets

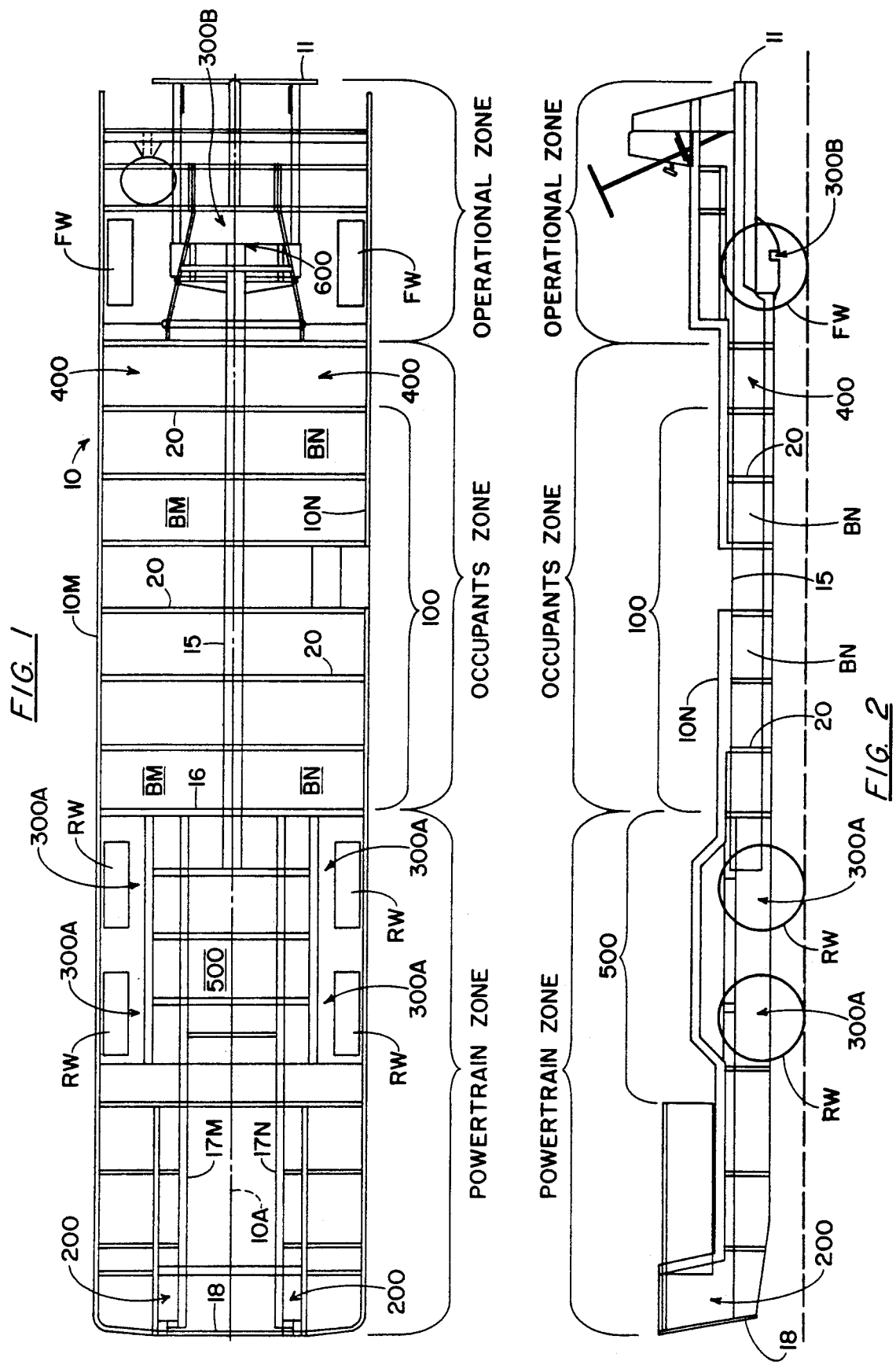

SKELETAL CHASSIS FOR MOTOR-HOME ROADWAY VEHICLES

RELATED (PARENT) PATENT APPLICATION

This application is a continuation-in-part of pending U.S. patent application Ser. No. 07/529,490 (filed May 29, 1990), now abandoned.

BACKGROUND AND OBJECTIVE OF THE INVENTION

For the skeletal chassis of very-lengthily longitudinally extending motor-home roadway vehicles, the primary and major weight-bearing capability has been traditionally provided by two or more longitudinally extending, parallel channel-type structural members that respectively extend along the entire chassis length. Because such traditional prior art structure provides numerous constraints for designers of motor-home vehicles, it is the general objective of the present invention to radically depart from these traditional chassis constraints to thereby open numerous ancillary vistas including, inter alia, capability through a single central elongate structural member for providing chassis torsional rigidity, capability for accommodating longitudinal utility and/or control conduits therewithin, and the capability therebelow for furnishing unusually transversely lengthly and longitudinally consecutive storage compartments.

IMPLEMENTATION OF THE INVENTION OBJECTIVES

Implementation of the invention objectives, and referred to hereabove, is described in the appended drawings and their related written descriptions.

BRIEF DESCRIPTION OF THE DRAWINGS

In the appended drawings, wherein like characters refer to like parts in the several views, and in which:

FIG. 1 is a top plan view of a representative embodiment (10) of the skeletal chassis concept herein for elongate motor-homes and which extend very-lengthily along longitudinal central-axis 10A thereof;

FIG. 2 is a sectional elevational view of FIG. 1. In drawing FIGS. 1 and 2, there are prominent reference characters: 10, 10A, POWERTRAIN-ZONE, OCCUPANTS'-ZONE, OPERATIONAL-ZONE, 15, 100, 200, 300A–300B, 400, 500, and 600;

DETAILED DESCRIPTION OF THE DRAWINGS

Drawing FIGS. 1 and 2

Figure 3:
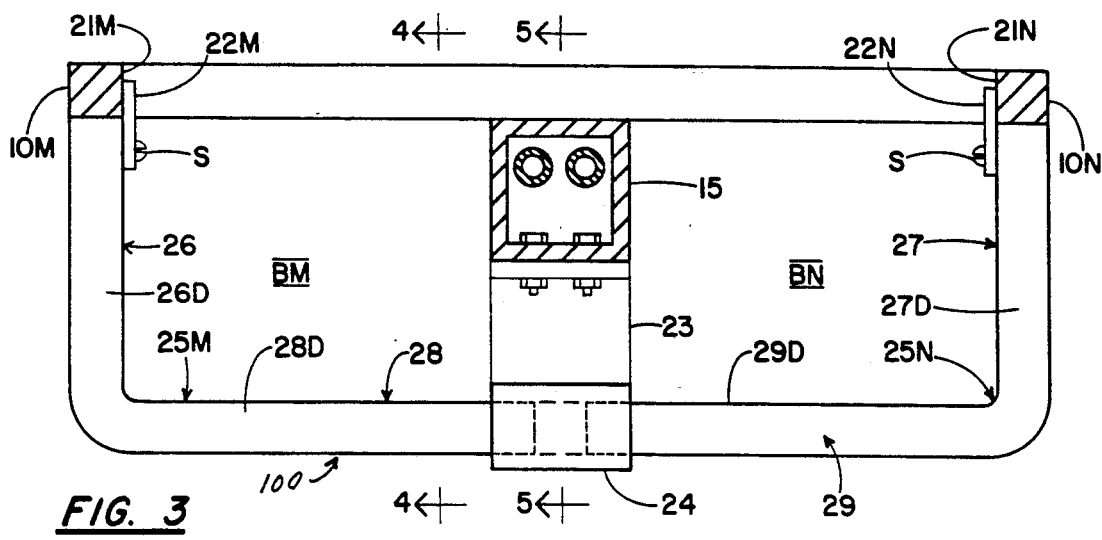
FIGS. 3–5 relate to transversely extending and sidewardly open storage compartments (100) consecutively spaced along the single longitudinal central-axial tubular, pre-eminent weight-bearing structural member (15) for representative chassis 10.

The motor-home vehicle skeletal chassis (e.g. embodiment 10) of the present invention extends horizontally and directionally longitudinally along central-axis 10A. Consecutively along central-axis 10A are:

(i) a frontal-end OPERATIONAL-ZONE (i.e. underlying the vehicle driver and overlying roadway-engageable front-wheels "FW");

(ii) a central OCCUPANTS'-ZONE (i.e. underlying vehicular passengers and overlying novel bin-like storage compartments "BM", "BN", and roadway-engageable rear-wheels "RW"); and (iii) a rearward POWERTRAIN-ZONE (e.g. that actuates rear-wheels "RW").

Among the structural members for skeletal chassis embodiment (10), depicted herein are:

(A) a single and tubular forward-member 15 extending horizontally along central-axis 10A from said OPERATIONAL-ZONE to a rearward portion of said OCCUPANTS'-ZONE. Herein, the rearward terminus of forward-member 15 is attached to a horizontal bridge-member 16 that is directionally transversely perpendicular to said longitudinal central-axis 10A. Tubular forward-member 15 is adapted to internally accommodate therealong, utility and control conduits;

(B) a pair of horizontal and directionally longitudinal rearward-members 17M and 17N (herein attached to bridge-members 16 and to rearward-member 18) and, along the POWERTRAIN-ZONE in flanking relationship to central-axis 10A; and (C) transversely separated (i.e. flanking central-axis 10A and tubular member 15) horizontal sideward-members 10M and 10N respectively extending forwardly from a bridge-member 16 and longitudinally along the OCCUPANTS'-ZONE toward the OPERATIONAL-ZONE.

However, the primary, and pre-eminent weight-bearing capability for the skeletal chassis concept herein (e.g. 10) is provided by the single only, central-axial (10A) longitudinally-elongate tubular forward-member 15.

Reference characters 100, 200, 300A–300B, 400, 500, and 600, which generally refer to further refinements of the FIGS. 1 and 2 general concept (10) will hereinafter be serially described with reference to the succeeding drawing FIGS. 3 to 20.

Figure 4:
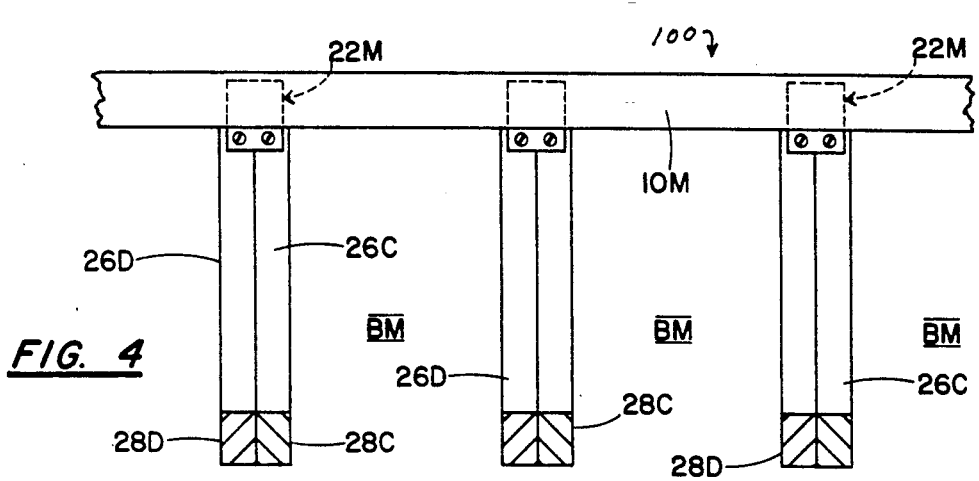
Figure 5:
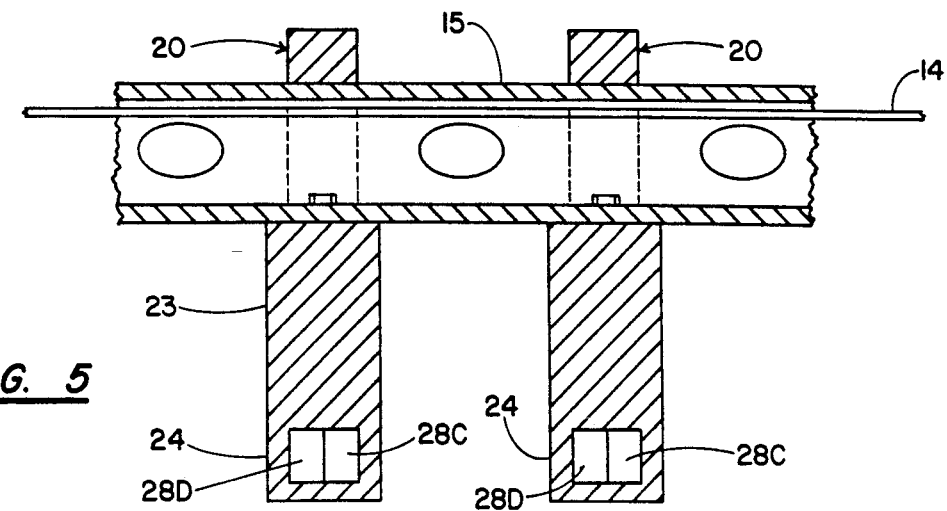

Drawing FIGS. 3–5

It is again noted, that for the skeletal chassis concept (10), and extending along the OCCUPANTS'-ZONE thereof, the chassis'single central-axial (10A) tubular forward-member 15 is the structurally pre-eminent chassis weight-bearing member. This described concept (10, 15) also makes it possible to provide a grid-like framework that furnishes unusually transversely lengthy (15–10M) (15–10N) and sidewardly-open (at 10M, at 10N) bin-like storage compartments (BN, BM). Specifically, each leftward bin-like storage compartment BM extends from forward member 15 to an entry-opening therefor a leftward sideward-member 10M, and each rightward bin-like storage compartment BN extends from forward member 15 to a sideward entry-opening therefor at rightward sideward-member 10N. The grid-like framework for bin-like compartments BM and BN includes a plurality of parallel, transversely extending rib members 20 located upon and attached (e.g. by welding) to regular longitudinally-spaced increments of forward-member 15. Each such rib member 20 has a left-end 21M (adjacent 10M) and a right-end 21N (adjacent 10N), and which foward-member-flanking ends 21M and 21N are attached (e.g. by welding)to sideward-members 10M and 10N, respectively. Underlying said transversely extending rib members 20, there is a plurality of upright U-shaped arrays (e.g. 25's) to complete the series of bin-like storage compartments (BN, BM). Each such array 25 might take the form of a U-shaped member including an upright left-leg 26 having an attached relationship to the left-end 21M of its overlying rib member and also including an upright right-leg 27 having an attached relationship to the right-end 21N of the same overlying rib member. Each such U-shaped member 25 also includes a directionally transverse horizontal base (28, 29) that is adapted to support horizontal flooring (not here shown) for the several thusly defined bin-like storage compartments BM and BN. Thus, confrontational portions of neighboring rib members 20 and of their underlying U-arrayed members (25) provide a leftward bin-like compartment BM and a rightward bin-like compartment BN, these respective bin-like compartments (BM, BN) flanking tubular forward-member 15 and being respectively provided (at 10M, at 10N) with sideward entry-openings.

Because of the need to service equipment located within such bins (BM, BN), and inasmuch as the bins' upright-walls and flooring need to be periodically removed and/or repaired), it is desirable that such U-shaped-arrayed elements (eg 25), which skeletally define any one bin-like compartment, be temporarily withdrawable from the chassis. Accordingly, each such U-shaped array (e.g. 25) is preferably provided as two half-units or half-compartments (25M, 25N) that respectively flank longitudinal central-axis 10A. For example, a leftward half-compartment 25M might comprise two abutting upright left-legs 26C and 26D and also two abutting horizontal left-arms 28C and 28D. Left-legs 26C and 26D can be removably connected (e.g. by screws S) to a lower portion of a left-plate 22M, the left-plate upper portion being welded between members 10N and 20. Left-arms 28C and 28D might be removably frictionally engaged within horizontal socket 24 of upright spacer members 23. Analagously, the rightward half-component 25 might comprise two abutting upright right-legs 27C and 27D and also two abutting horizontal right-arms 29C and 29D. Right-legs 27C and 27D are removably connected (e.g. screws S) to the lower portion of right-plate 22N, the right-plate upper portion being welded between members 10N and 20. The right-arms 29C and 29D might be frictionally engaged within said horizontal socket 24. Upright spacer members 23-24 are bolted or otherwise securely attached to the underside of longitudinal tubular forward-member 15.

I claim:

1. Skeletal chassis for motor-home roadway vehicles and vehicularly directionally longitudinally comprising along a horizontal and directionally longitudinal central-axis thereof, three zones, namely:
    (A) a front-end operational-zone for the vehicle driver;
    (B) a central occupants'-zone comprising:
    (Bi) three directionally longitudinally extending members therealong including a tubular forward-member along said central-axis and that provides the primary and pre-eminent weight-bearing capability for said chassis, and further including a leftward sideward-member and a rightward sideward-member together flanking said central-axis and defining a transverse width for said chassis occupants's-zone; and
    (Bii) a directionally transversely extending framework delineating a plurality of directionally longitudinally consecutive pairs of transversely aligned storage compartments flanking said central-axis and each compartment being provided with an up-right entrance-opening located immediately below respective sideward-members, said grid-like framework at each pair of compartments including: a plurality of directionally transversely extending horizontal rib members located at and attached to substantially regularly-spaced longitudinal increments of said tubular forward-member, each such transverse rib being substantially perpendicular to said forward-member and having a left-end located adjacent said leftward sideward-member and also having a right-end located adjacent to said rightward sideward-member; horizontal base means located below and extending in both transverse directions from said tubular forward-member; upright left-leg means located adjacent to, extending downwardly from the leftward sideward-member, and being connected to a leftward portion of said horizontal base means; and upright right-leg means located adjacent to, extending downwardly from the rightward sideward-member, and being connected to a rightward portion of said horizontal base means; and
    (C) a rearward powertrain-zone located adjacently rearwardly of said central occupants'-zone.

2. The skeletal chassis of claim 1 wherein the left-leg means is also attached to left-ends of said horizontal rib members, and wherein the right-leg means is also attached to right-ends of said horizontal rib members.

3. The skeletal chassis of claim 2 wherein the left-leg means takes the form of distinct left-legs respectively directly attached to and downwardly depending form left-ends of said horizontal ribs, and wherein the right-leg means takes the form of distinct right-legs respectively directly attached to and downwardly depending from right-ends of said horizontal ribs.

4. The skeletal chassis of claim 3 wherein at each transversely aligned pair of compartments: the left-leg and at least the leftward portion of the horizontal base means are integrally connected and the left-legs are removably connected to the leftward sideward-member; and the right-legs and at least the rightward portion of the horizontal base means are integrally connected and the right-legs are removably connected to the rightward sideward-member.

5. The skeletal chassis of claim 4 wherein the horizontal base means leftward portion and rightward portion are inter-connected below the elevation of said forward-member.

6. The skeletal chassis of claim 5 wherein the horizontal base leftward portion and rightward portion are together frictionally engaged within a spacer member that extends downwardly from said tubular forward-member.

* * * * *